United States Patent
Belleschi et al.

(10) Patent No.: US 11,910,407 B2
(45) Date of Patent: Feb. 20, 2024

(54) METHOD FOR RESOURCE ALLOCATION IN DEVICE TO DEVICE COMMUNICATION

(71) Applicant: Telefonaktiebolaget LM Ericsson (publ), Stockholm (SE)

(72) Inventors: Marco Belleschi, Solna (SE); Shehzad Ali Ashraf, Aachen (DE); Gabor Fodor, Hässelby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 475 days.

(21) Appl. No.: 17/266,775

(22) PCT Filed: Aug. 2, 2019

(86) PCT No.: PCT/EP2019/070915
§ 371 (c)(1),
(2) Date: Feb. 8, 2021

(87) PCT Pub. No.: WO2020/030554
PCT Pub. Date: Feb. 13, 2020

(65) Prior Publication Data
US 2021/0321363 A1 Oct. 14, 2021

Related U.S. Application Data

(60) Provisional application No. 62/716,761, filed on Aug. 9, 2018.

(51) Int. Cl.
*H04W 72/00* (2023.01)
*H04W 72/02* (2009.01)
(Continued)

(52) U.S. Cl.
CPC ........ *H04W 72/30* (2023.01); *H04W 72/02* (2013.01); *H04W 72/0446* (2013.01); *H04W 72/0453* (2013.01); *H04W 72/1263* (2013.01)

(58) Field of Classification Search
CPC . H04W 72/30; H04W 72/02; H04W 72/0446; H04W 72/0453; H04W 72/1263; H04W 72/51; H04W 4/70; H04W 76/23
(Continued)

(56) References Cited

U.S. PATENT DOCUMENTS

2018/0116007 A1* 4/2018 Yasukawa ......... H04W 72/1263
2018/0132297 A1* 5/2018 Li ....................... H04W 72/121
(Continued)

FOREIGN PATENT DOCUMENTS

| EP | 3273634 A1 | 1/2018 |
|---|---|---|
| WO | 2018059292 A1 | 4/2018 |

OTHER PUBLICATIONS

International Search Report and Written Opinion dated Oct. 23, 2019 for International Application No. PCT/ EP2019/070915 filed Aug. 2, 2019, consisting of 21—pages.
(Continued)

*Primary Examiner* — Candal Elpenord
(74) *Attorney, Agent, or Firm* — Christopher & Weisberg, P.A.

(57) ABSTRACT

A method, system and apparatus are disclosed. A network node configured to communicate with a wireless device is provided. The network node configured to, and/or comprising a radio interface and/or comprising processing circuitry configured to receive a unicast request message from a wireless device where the unicast request message includes information associated with a request for a unicast connection, and determine whether to permit establishment of the requested unicast connection based at least in part on the information in the unicast request message.

21 Claims, 7 Drawing Sheets

(51) Int. Cl.
H04W 72/04 (2023.01)
H04W 72/12 (2023.01)
H04W 72/30 (2023.01)
H04W 72/0446 (2023.01)
H04W 72/0453 (2023.01)
H04W 72/1263 (2023.01)

(58) Field of Classification Search
USPC .................................................. 370/329–330
See application file for complete search history.

(56) References Cited

U.S. PATENT DOCUMENTS

| | | | | |
|---|---|---|---|---|
| 2018/0213379 | A1* | 7/2018 | Xiong | H04W 4/70 |
| 2018/0376308 | A1* | 12/2018 | Xiao | H04L 45/22 |
| 2020/0314803 | A1* | 10/2020 | Zhang | H04W 72/542 |
| 2023/0099813 | A1* | 3/2023 | Parron | H04W 72/04 |
| | | | | 370/330 |

OTHER PUBLICATIONS

3GPP TR 22.886 V16.0.0; 3rd Generation Partnership Project; Technical Specification Group Services and System Aspects; Study on enhancement of 3GPP Support for 5G V2X Services (Release 16), Jun. 2018, consisting of 67—pages.

3GPP TS 22.185 V14.2.1; 3rd Generation Partnership Project; Technical Specification Group Services and System Aspects; Service requirements for V2X services; Stage 1 (Release 14), Nov. 2016, consisting of 14—pages.

3GPP TS 36.213 V14.2.0; 3rd Generation Partnership Project; Technical Specification Group Radio Access Network; Evolved Universal Terrestrial Radio Access (E-UTRA); Physical layer procedures (Release 14), Mar. 2017, consisting of 454—pages.

3GPP TS 36.321 V14.2.1; 3rd Generation Partnership Project; Technical Specification Group Radio Access Network; Evolved Universal Terrestrial Radio Access (E-UTRA); Medium Access Control (MAC) protocol specification (Release 14), Mar. 2017, consisting of 106—pages.

3GPP TS 36.212 V14.1.1; 3rd Generation Partnership Project; Technical Specification Group Radio Access Network; Evolved Universal Terrestrial Radio Access (E-UTRA); Multiplexing and channel coding (Release 14), Jan. 2017, consisting of 149—pages.

3GPP TS 36.331 V14.2.2; 3rd Generation Partnership Project; Technical Specification Group Radio Access Network; Evolved Universal Terrestrial Radio Access (E-UTRA); Radio Resource Control (RRC); Protocol specification (Release 14), Apr. 2017, consisting of 721—pages.

* cited by examiner

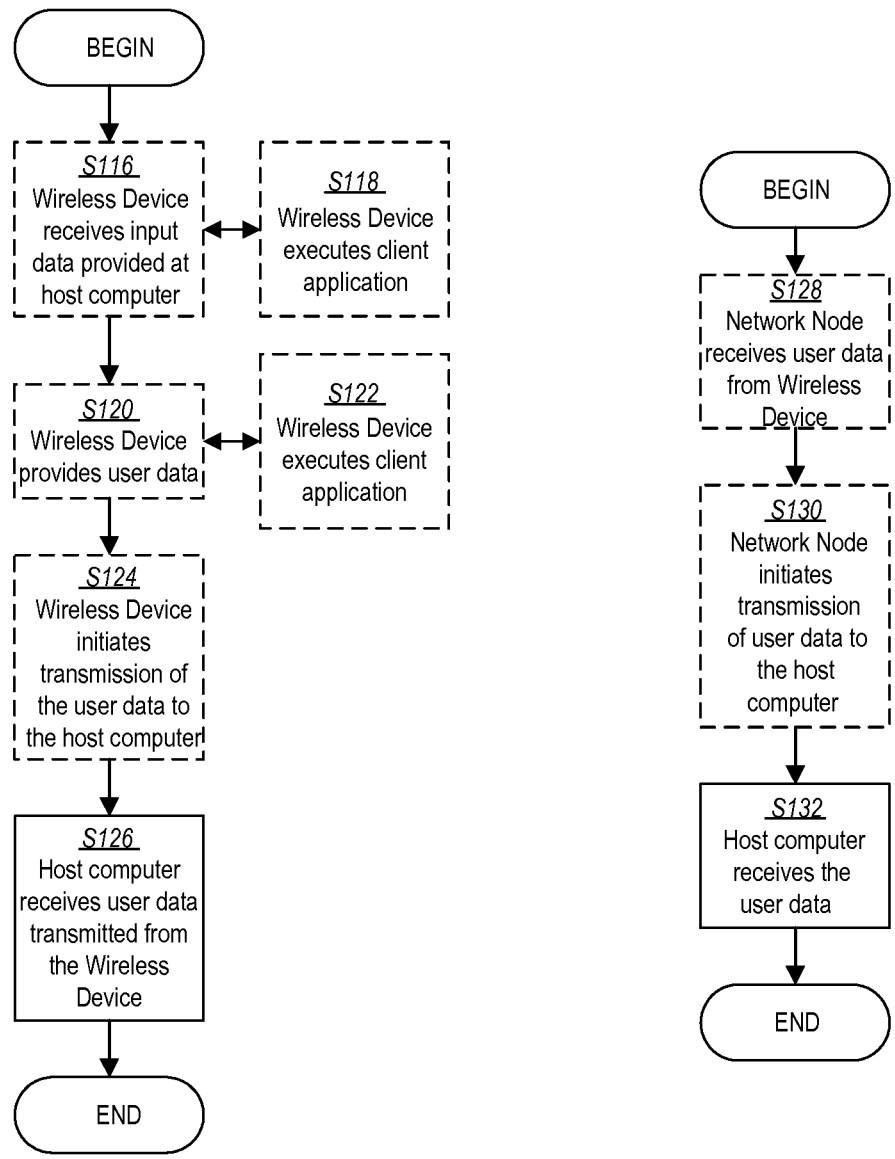

METHOD FOR RESOURCE ALLOCATION IN DEVICE TO DEVICE COMMUNICATION

CROSS-REFERENCE TO RELATED APPLICATIONS

This application is a Submission Under 35 U.S.C. § 371 for U.S. National Stage Patent Application of International Application No. PCT/EP2019/070915, filed Aug. 2, 2019 entitled "METHOD FOR RESOURCE ALLOCATION IN DEVICE TO DEVICE COMMUNICATION," which claims priority to U.S. Provisional Application No. 62/716,761, filed Aug. 9, 2018, entitled "METHOD FOR UNICAST/MULTICAST RESOURCE ALLOCATION OVER SIDELINK," the entireties of both of which are incorporated herein by reference.

TECHNICAL FIELD

The present disclosure relates to wireless communications, and in particular, to resource allocation in device to device communication.

BACKGROUND

Device-to-device (D2D, also referred to as "device to device" and/or sidelink) communication in cellular networks is defined as direct communication between two wireless devices without traversing the base station or core network. In Release 14 and Release 15 of the 3rd generation partnership project (3GPP) wireless communication standards, the extensions for the D2D work comprise support for vehicle-to-everything (V2X) communication. Various V2X scenarios for Long Term Evolution (LTE) and/or New Radio (NR) based networks is illustrated in FIG. 1 where various wireless devices 2a-2e in communication with a network node 4 and with each other are illustrated. V2X is described in detailed below.

V2X Communications

In Third Generational Partnership Projection (3GPP, a standardization organization) Release 14 (Rel-14) and Release 15 (Rel-15), the extensions for the device-to-device (D2D) systems consists of supporting Vehicle to Everything (V2X) communication, which includes any combination of direct communication between vehicles, pedestrians and infrastructure. See for example 3GPP TS 22.185 V14.2.1 (Release 14). V2X communication may take advantage of a network (NW) infrastructure, when available, but at least basic V2X connectivity may be possible even in case of lack of coverage.

In 3GPP Release 16, 3GPP may study and possibly specify V2X communication using New Radio (NR).

V2X communications may carry both non-safety and safety information, where each of the applications and services may be associated with specific requirements sets, e.g., in terms of latency, reliability, data rates, etc.

There are several different use cases defined for V2X:

V2V (vehicle-to-vehicle): covering Long Term Evolution (LTE)/New Radio (NR)-based communication between vehicles, either via the cellular interface (known as Uu) or via the sidelink interface (known as PC5).

V2P (vehicle-to-pedestrian): covering LTE/NR-based communication between a vehicle and a device carried by an individual (e.g., handheld terminal carried by a pedestrian, cyclist, driver or passenger), either via Uu or sidelink (PC5).

V2I/N (vehicle-to-infrastructure/network): covering LTE/NR-based communication between a vehicle and a roadside unit/network. A roadside unit (RSU) is a transportation infrastructure entity (e.g., an entity transmitting speed notifications) that communicates with V2X capable wireless devices over sidelink (PC5) or over Uu. For V2N, the communication is performed on Uu.

The sidelink may refer to a direct communication interface between wireless devices (also referred to as PC5 interface in LTE). V2P covers LTE-based communication between a vehicle and a device carried by an individual (e.g. handheld terminal carried by a pedestrian, cyclist, driver or passenger), either via Uu or sidelink. V2I/N covers LTE-based communication between a vehicle and a roadside unit/network. A roadside unit (RSU) is a transportation infrastructure entity (e.g. an entity transmitting speed notifications) that communicates with V2X capable wireless devices over sidelink or over Uu. For V2N, the communication is performed via Uu.

Sidelink (PC5) Resource Allocation for V2X

In 3GPP Rel. 14/15, there are two different resource allocation (RA) procedures for V2X on sidelink, i.e., centralized RA (also referred to as "mode 3") and distributed RA (also referred to as "mode 4"). The transmission resources are selected within a resource pool which is predefined or configured by the network (NW), i.e., network node.

With centralized or NW-scheduled RA (i.e., mode-3), the transmitting sidelink radio resources are dynamically scheduled/allocated by the NW. Similar to Uu scheduling, the wireless device requests resources for transmissions to the NW using uplink signaling (SR, SL-BSR), and as a response, the NW may grant resources via Physical Downlink Control Channel (PDCCH) for sidelink transmission to the wireless device. Depending on network decision, the grant provided by the NW may be valid for the transmission of a single transport block (TB), including its retransmission, or for the transmission of multiple TBs over multiple periodic resources as for the semi-persistent scheduling (SPS) grant.

With distributed or autonomous RA (i.e., mode-4) a resource allocation scheme is intended in which the NW provides a set of resources in broadcast fashion to be used on a certain carrier. Such resources are then contended for by wireless devices interested in sidelink operations, according to certain rules. In particular, a wireless device, before using certain resources, may sense such resources for some time, and when the resources are deemed to be free the wireless device can select them for sidelink transmissions. Sensing is based on decoding of sidelink control information (SCI) and reference signal received power (RSRP) measurement of physical sidelink shared channel (PSSCH) from surrounding wireless devices. To enable such sensing-based resource allocation, no wireless device specific scrambling is adopted which implies that on sidelink a wireless device may not be recognized in L1.

Depending on the specific service to be transmitted, the wireless device may either reserve such resources for multiple transmissions according to a desired pattern (which repeats periodically in the time domain), or the wireless device can simply select such resource for a single "one-shot" transmission.

For both RA modes, a sidelink control information (SCI) is transmitted on physical sidelink control channel (PSCCH) to indicate the assigned sidelink resources.

Future V2X Enhancements

The 3GPP SA1 working group has provided new service requirements for future V2X services in a study/work item where twenty-five use cases were identified for advanced V2X services that can be used in $5^{th}$ Generation (5G) wireless communication systems (i.e., LTE and NR). Such use cases are categorized into four use case groups: vehicles platooning, extended sensors, advanced driving and remote driving. Direct unicast transmission over sidelink may be needed in some use cases such as platooning, cooperative driving, dynamic ride sharing, video/sensor data sharing, etc.

The consolidated requirements for each use case group are captured in 3GPP Technical Report (TR) 22.886 V16.0.0 (2018 Jun. 23). For these advanced applications, the expected requirements to meet the needed data rate, capacity, reliability, latency, communication range and speed are made more stringent.

SUMMARY

In order to at least help meet these requirements, some improvements may need to be introduced, for instance, link adaption for sidelink/D2D based on e.g., channel state information (CSI) feedback, more HARQ processes and adaptive HARQ retransmissions for sidelink based on HARQ feedback, etc., similar for cellular Uu link. Some embodiments advantageously provide methods, systems, and apparatuses for unicast connection related processes and/or functions. In particular, the disclosure describes mechanisms/methods to configure sidelink radio resources for wireless devices involved in unicast connections. These scheduling mechanisms are markedly different from mode-3 and mode-4 scheduling and are applicable to unicast sidelink communications in the licensed spectrum, in which the mobile network operator (MNO) may also provide mobile broadband (MBB) services.

According to one aspect of the disclosure, a network node for allocating a resource pool for use by a wireless device in device to device communications is provided. The resource pool is one of a plurality of resource pools where each resource pool includes one or more time and frequency resource. The network node includes processing circuitry configured to: obtain one or more properties associated with a unicast, multicast or broadcast connection, establish a unicast, multicast or broadcast connection for the wireless device, and allocate a resource pool per wireless device for the established connection based on the one or more properties.

According to one or more embodiments of this aspect, the one or more properties are one or more of: a wireless device location, a wireless device capability, a maximum power level for the unicast connection, a quality of service level, a global unicast connection identifier, and a physical cell identifier of a cell that is in communication with the wireless device. According to one or more embodiments of this aspect, the resource pool corresponds to another resource pool allocated to another wireless device. According to one or more embodiments of this aspect, the processing circuitry is further configured to indicate the allocated resource pool to the wireless device for one of autonomous resource allocation and network node scheduled resource allocation.

According to one or more embodiments of this aspect, the obtained one or more properties are received from the wireless device in a request for configuration of the unicast, multicast or broadcast connection. According to one or more embodiments of this aspect, the request message indicates a preferred casting type, and the allocated resource pool is for the preferred casting type. According to one or more embodiments of this aspect, the request message indicates a plurality of casting types, each casting type having a respective priority, and the allocated resource pool is for one of the plurality of casting types. According to one or more embodiments of this aspect, the plurality of casting types includes at least two of unicast, multicast and broadcast. According to one or more embodiments of this aspect, the resource pool corresponds to at least one of a set of spatial directions and a location area. According to one or more embodiments, the allocated resource pool is dedicated for use by the wireless device.

According to another aspect of the disclosure, a wireless device for using a resource pool for device to device communication is provided. The resource pool is one of a plurality of resource pools where each resource pool corresponds to time and frequency resources. The wireless device includes processing circuitry configured to receive an indication of an allocated resource pool where the resource pool is allocated to an established unicast, multicast or broadcast connection for the wireless device and the resource pool is allocated based on one or more properties associated with the unicast, multicast or broadcast connection.

According to one or more embodiments of this aspect, one or more properties are one or more of: a wireless device location, a wireless device capability, a maximum power level for the unicast connection, a quality of service level, a global unicast connection identifier, and a physical cell identifier of a cell that is in communication with the wireless device. According to one or more embodiments of this aspect, the resource pool corresponds to another resource pool allocated to another wireless device. According to one or more embodiments of this aspect, the indication of the allocated resource pool is for one of autonomous resource allocation and network node scheduled resource allocation.

According to one or more embodiments of this aspect, the processing circuitry is further configured to cause transmission of a request message that indicates the one or more properties for configuration of the unicast, multicast or broadcast connection. According to one or more embodiments of this aspect, the request message indicates a preferred casting type, and the allocated resource pool is for the preferred casting type. According to one or more embodiments of this aspect, the request message indicates a plurality of casting types, each casting type having a respective priority, and the allocated resource pool is for one of the plurality of casting types. According to one or more embodiments of this aspect, the plurality of casting types includes at least two of unicast, multicast and broadcast. According to one or more embodiments of this aspect, the resource pool corresponds to at least one of a set of spatial directions and a location area. According to one or more embodiments, the allocated resource pool is dedicated for use by the wireless device.

According to another aspect of the disclosure, a method implemented by a network node for allocating a resource pool for use by a wireless device in device to device communications is provide. The resource pool is one of a plurality of resource pools where each resource pool includes one or more time and frequency resource. One or more properties associated with a unicast, multicast or broadcast connection is obtained. A unicast, multicast or broadcast connection for the wireless device is established. A resource pool per wireless device for the established connection is allocated based on the one or more properties.

According to one or more embodiments of this aspect, the one or more properties are one or more of a wireless device location, a wireless device capability, a maximum power level for the unicast connection, a quality of service level, a global unicast connection identifier, and a physical cell identifier of a cell that is in communication with the wireless device. According to one or more embodiments of this aspect, the resource pool corresponds to another resource pool allocated to another wireless device. According to one or more embodiments of this aspect, the allocated resource pool are indicated to the wireless device for one of autonomous resource allocation and network node scheduled resource allocation.

According to one or more embodiments of this aspect, the obtained one or more properties are received from the wireless device in a request for configuration of the unicast, multicast or broadcast connection. According to one or more embodiments of this aspect, the request message indicates a preferred casting type, and the allocated resource pool is for the preferred casting type. According to one or more embodiments of this aspect, the request message indicates a plurality of casting types, each casting type having a respective priority, and the allocated resource pool is for one of the plurality of casting types. According to one or more embodiments of this aspect, the plurality of casting types includes at least two of unicast, multicast and broadcast. According to one or more embodiments of this aspect, the resource pool corresponds to at least one of a set of spatial directions and a location area. According to one or more embodiments, the allocated resource pool is dedicated for use by the wireless device.

According to another aspect of the disclosure, a method implemented by a wireless device for using a resource pool for device to device communication is provided. The resource pool is one of a plurality of resource pools where each resource pool corresponds to time and frequency resources. An indication of an allocated resource pool is received where the resource pool is allocated to an established unicast, multicast or broadcast connection for the wireless device and the resource pool is allocated based on one or more properties associated with the unicast, multicast or broadcast connection.

According to one or more embodiments of this aspect, one or more properties are one or more of a wireless device location, a wireless device capability, a maximum power level for the unicast connection, a quality of service level, a global unicast connection identifier, and a physical cell identifier of a cell that is in communication with the wireless device. According to one or more embodiments of this aspect, the resource pool corresponds to another resource pool allocated to another wireless device. According to one or more embodiments of this aspect, the indication of the allocated resource pool is for one of autonomous resource allocation and network node scheduled resource allocation.

According to one or more embodiments of this aspect, transmission is caused of a request message that indicates the one or more properties for configuration of the unicast, multicast or broadcast connection. According to one or more embodiments of this aspect, the request message indicates a preferred casting type, and the allocated resource pool is for the preferred casting type. According to one or more embodiments of this aspect, the request message indicates a plurality of casting types where each casting type has a respective priority, and the allocated resource pool is for one of the plurality of casting types. According to one or more embodiments of this aspect, the plurality of casting types includes at least two of unicast, multicast and broadcast. According to one or more embodiments of this aspect, the resource pool corresponds to at least one of a set of spatial directions and a location area. According to one or more embodiments, the allocated resource pool is dedicated for use by the wireless device.

According to another aspect of the disclosure, a computer program is provided. The computer program comprises instructions which when executed on processing circuitry, causes the processing circuitry to perform any one of the methods described herein.

According to another aspect of the disclosure, a computer readable storage medium is provided. The computer readable storage medium comprises memory where the memory comprises a computer program described herein.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is a flow chart illustrating exemplary methods implemented in a communication system including a host computer, a network node and a wireless device for receiving user data at a host computer according to some embodiments of the present disclosure;

FIG. 7 is a flow chart illustrating exemplary methods implemented in a communication system including a host computer, a network node and a wireless device for receiving user data according to some embodiments of the present disclosure;

DETAILED DESCRIPTION

Figure 1:
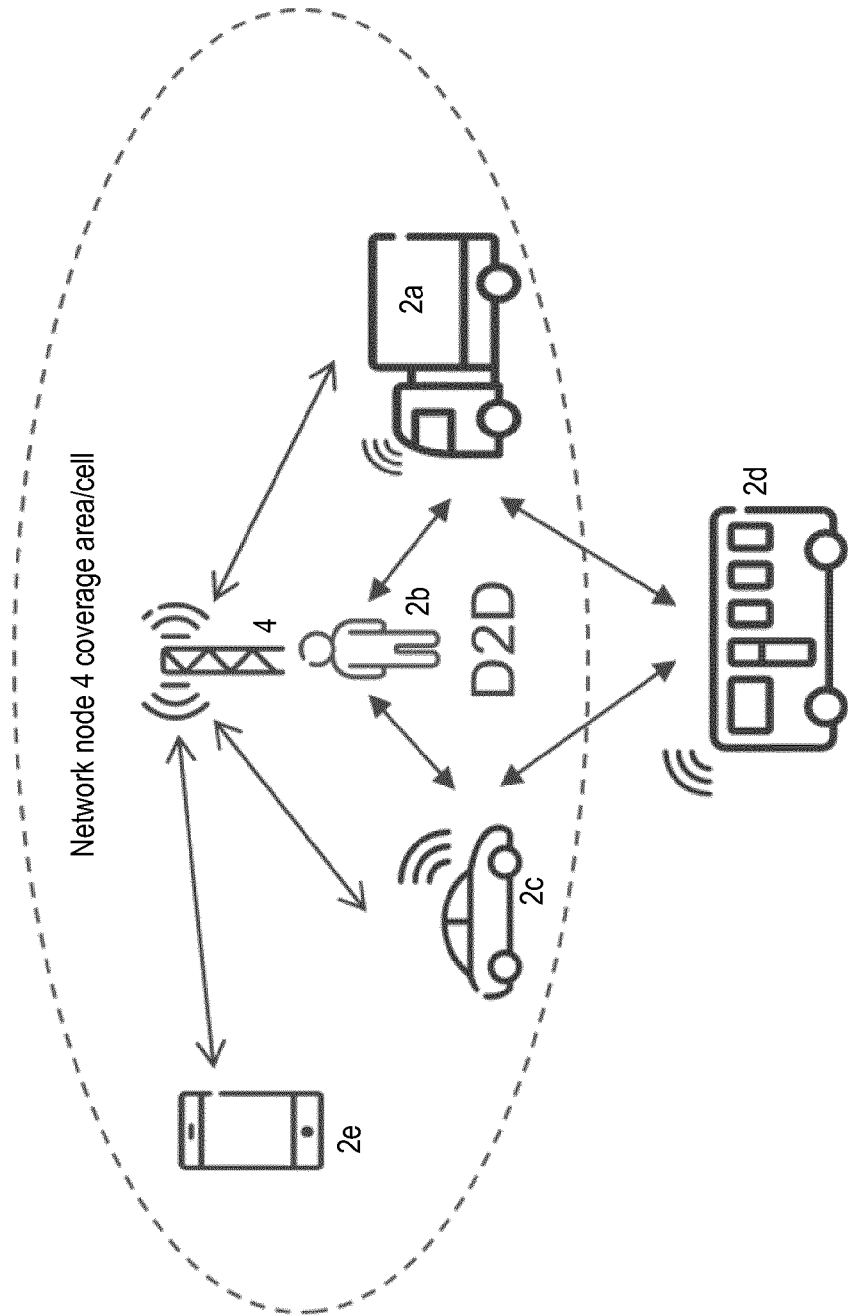
FIG. 1 is a diagram of V2X scenarios in a communication system.

The latest vehicle-to-everything (V2X) use-cases have more stringent requirement on data rates, latency and/or reliability. At the same time, there are several use-cases which (may only) require unicast transmissions. Therefore, NR may support unicast transmissions on a sidelink with the possibility of layer 1 (L1) feedback (e.g., Channel State Information (CSI) reports and Hybrid automatic repeat request (HARD) Acknowledgement (ACK)/Negative Acknowledgement (NACK)) to increase spectral efficiency and/or reliability. Also, a wireless device may maintain multiple unicast sidelinks to different wireless devices simultaneously. These may be used for transmission, reception, or both.

On the other hand, existing sidelink resource allocation schemes have been designed for physical layer broadcast type of device to device communications. For the case of mode-4 RA, for example, a set of a pool of resources is broadcast by the network node for a sidelink/device-to-device (D2D) transmissions in a given carrier, and it is used by all wireless devices camping or connected to such carrier which contend for resources available in such a pool. For sidelink unicast communication, or multicast communication such a scheme might not be sufficient to guarantee reliable performances which are typically required by sidelink unicast communications.

The network node may adopt mode-3 scheduling for unicast communications in order to increase sidelink performances as compared with mode-4 RA. However, existing mode-3 scheduling is designed taking into account broadcast communication, i.e., it is not possible to assign different mode-3 pools to the same wireless device for different unicast connections (e.g., in cases where the wireless device is involved in more than one unicast communications with different wireless devices), meaning that there is no wireless device mechanism to handle multiple links simultaneously. Additionally, mode-3 typically implies relevant Uu signaling (SR, SL-BSR, PDCCH) as compared to mode-4 that in some cases is not desirable. Also, mode-3 scheduling implies a high scheduling and signaling burden on the central scheduler (network node such as eNB/gNB), especially when the network node takes into account the prevailing PC5 channel conditions.

This disclosure solves at least some of the problems with existing systems by providing mechanisms/methods to configure sidelink radio resources for wireless device involved in unicast connections. These scheduling mechanisms are markedly different from mode-3 and mode-4 scheduling and are especially applicable to unicast sidelink communications in licensed spectrum, in which the mobile network operator (MNO) may also provide mobile broadband (MBB) services.

Therefore, this disclosure advantageously provides methods for autonomous and network scheduled resource allocation to enable reliable unicast communications. One advantage provided by this disclosure is that it enables wireless devices to take advantage of unicast sidelink communication in terms of achieved bitrate, QoS and communication range and at the same time reduce the computational and scheduling burden at the central scheduling entity such as a network node, e.g., eNB or gNB.

Before describing in detail exemplary embodiments, it is noted that the embodiments reside primarily in combinations of apparatus components and processing steps related to unicast connection related processes and/or functions. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

A cell may be generally a communication cell, e.g., of a cellular or mobile communication network, provided by a node. A serving cell may be a cell on or via which a network node (the node providing or associated to the cell, e.g., base station, gNB or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. wireless device) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. wireless device) may comprise configuring the wireless device to perform certain measurements on certain subframes or radio resources and reporting such measurements according to embodiments of the present disclosure.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, Minimization Drive Test (MDT) node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device such as a user equipment or a radio network node.

In some embodiments, the non-limiting terms wireless device or a user equipment (UE) are used interchangeably. The wireless device herein can be any type of wireless device capable of communicating with a network node or another wireless device over radio signals, such as wireless device. The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Transmitting in downlink may pertain to transmission from the network or network node to the wireless device. Transmitting in uplink may pertain to transmission from the wireless device to the network or network node. Transmitting in sidelink/D2D may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

D2D communication (which may also be referred to as sidelink communication and vice versa) may comprise transmission and/or reception of data. It may be considered that D2D communication may generally comprise and/or be defined by data being transmitted from one wireless device, e.g. the transmitter or transmitter wireless device, (in particular directly) to another wireless device, e.g. the receiver or receiver wireless device, in particular without the data transmitted being transmitted and/or relayed via one or more of a cellular network, core network, network node and radio node of such. D2D communication may comprise relaying and/or hopping via a plurality of wireless devices. D2D communication may be implemented using a direct communication interface between wireless devices (also referred to as PC5 interface in LTE). It may be considered that D2D communication is supported by a network, e.g. by the network and/or base station or radio node providing resource allocation, e.g. allocating resource pools for D2D communication such as based on one or more properties associated with a unicast, multicast or broadcast communication, as described herein. D2D communication may for example comprise D2D discovery transmission and/or D2D data transmission (the data may in particular be user data and/or payload data). Generally, D2D transmissions may be provided on resources used for UL and/or DL transmissions in cellular communication. Extensions for the D2D may include support for vehicle-to-everything (V2X) communication, as described herein.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
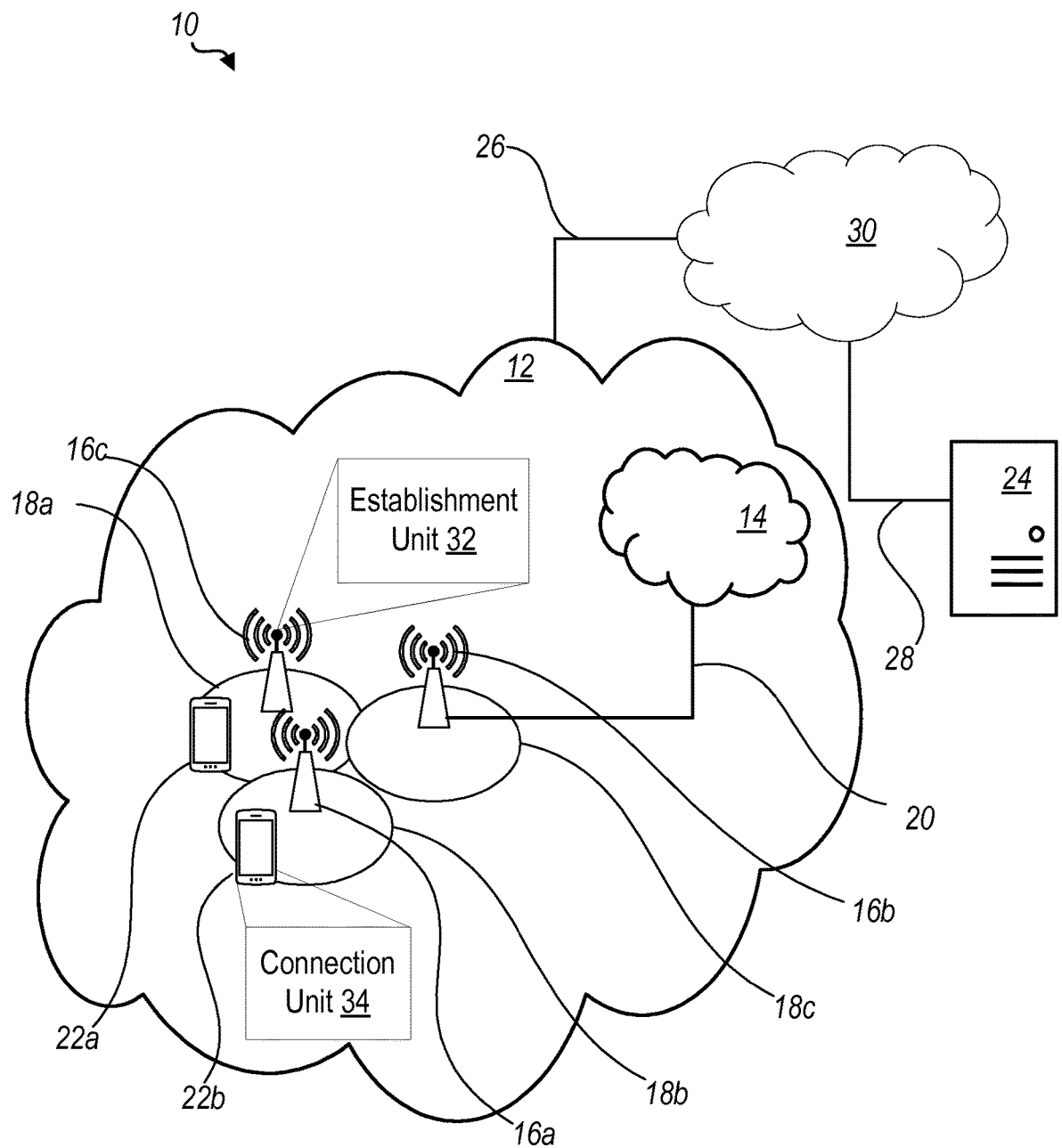
FIG. 2 is a schematic diagram of an exemplary network architecture illustrating a communication system connected via an intermediate network to a host computer according to the principles in the present disclosure.

Returning to the drawing figures, in which like elements are referred to by like reference numerals, there is shown in FIG. 2 a schematic diagram of a communication system 10, according to an embodiment, such as a third generation partnership projection (3GPP)-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device 22a located in coverage area 18a is configured to wirelessly connect to, or be paged by, the corresponding network node 16c. A second wireless device 22b in coverage area 18b is wirelessly connectable to the corresponding network node 16a. While a plurality of wireless devices 22a, 22b (collectively referred to as wireless devices 22) are illustrated in this example, the disclosed embodiments are equally applicable to a situation where a sole wireless device 22 is in the coverage area or where a sole wireless device 22 is connecting to the corresponding network node 16, or where at least two wireless devices 22a-22c are within the same coverage area. Note that although only two wireless devices 22 and three network nodes 16 are shown for convenience, the communication system may include many more wireless devices 22 and network nodes 16.

Also, it is contemplated that a wireless device 22 can be in simultaneous communication and/or configured to separately communicate with more than one network node 16 and more than one type of network node 16. For example, a wireless device 22 can have dual connectivity with a network node 16 that supports LTE and the same or a different network node 16 that supports NR. As an example, wireless device 22 can be in communication with a network node 16 for Long Term Evolution (LTE)/Evolved Universal Terrestrial Radio Access Network (E-UTRAN) and a gNB for NR/Next Gen (NG)-Radio Access Network (RAN).

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected wireless devices 22a, 22b and the host computer 24. The connectivity may be described as an over-the-top (OTT) connection. The host computer 24 and the connected wireless devices 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected wireless device 22a. Similarly, the network node 16 need not be aware of the future routing of an outgoing uplink communication originating from the wireless device 22a towards the host computer 24.

A network node 16 is configured to include an establishment unit 32 which is configured to perform unicast connection related functions and/or processes as described herein. A wireless device 22 is configured to include a connection unit 34 which is configured to perform unicast connection related functions and/or processes as described herein.

Example implementations, in accordance with an embodiment, of the wireless device 22a-22c, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a wireless device 22 connecting via an OTT connection 52 terminating at the wireless device 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include an information unit 54 configured to enable the service provider to receive, forward and/or generate information related to unicast connection related functions and/or processes described herein. For example, in one or more embodiment, processing circuitry 42 is configured to perform one or more functions of establishment unit 32 and/or connection unit 34.

The communication system 10 further includes a network node 16 provided in a communication system 10 and comprising hardware 58 enabling it to communicate with the host computer 24 and with the wireless device 22. The hardware 58 may include a communication interface 60 for setting up and maintaining a wired or wireless connection with an interface of a different communication device of the communication system 10, as well as a radio interface 62 for setting up and maintaining at least a wireless connection 64 with a wireless device 22 located in a coverage area 18 served by the network node 16. The radio interface 62 may be formed as or may include, for example, one or more radio frequency (RF) transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include establishment unit 32 configured to perform unicast connection related functions and/or processes as described herein.

The communication system 10 further includes the wireless device 22 already referred to. The wireless device 22 may have hardware 80 that may include a radio interface 82 configured to set up and maintain a wireless connection 64 with a network node 16 serving a coverage area 18 in which the wireless device 22 is currently located, and/or configured to set up and maintain a wireless connection 65 with one or more other wireless devices 22 located in the same and/or different coverage areas 18 such as a V2X connection, D2D connection, etc. The radio interface 82 may be formed as or may include, for example, one or more RF transmitters, one or more RF receivers, and/or one or more RF transceivers.

The hardware 80 of the wireless device 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 90, which is stored in, for example, memory 88 at the wireless device 22, or stored in external memory (e.g., database, storage array, network storage device, etc.) accessible by the wireless device 22. The software 90 may be executable by the processing circuitry 84. The software 90 may include a client application 92. The client application 92 may be operable to provide a service to a human or non-human user via the wireless device 22, with the support of the host computer 24. In the host computer 24, an executing host application 50 may communicate with the executing client application 92 via the OTT connection 52 terminating at the wireless device 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by wireless device 22. The processor 86 corresponds to one or more processors 86 for performing wireless device 22 functions described herein. The wireless device 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to wireless device 22. For example, the processing circuitry 84 of the wireless device 22 may include a connection unit 34 configured to perform unicast connection related functions and/or processes as described herein.

Figure 3:
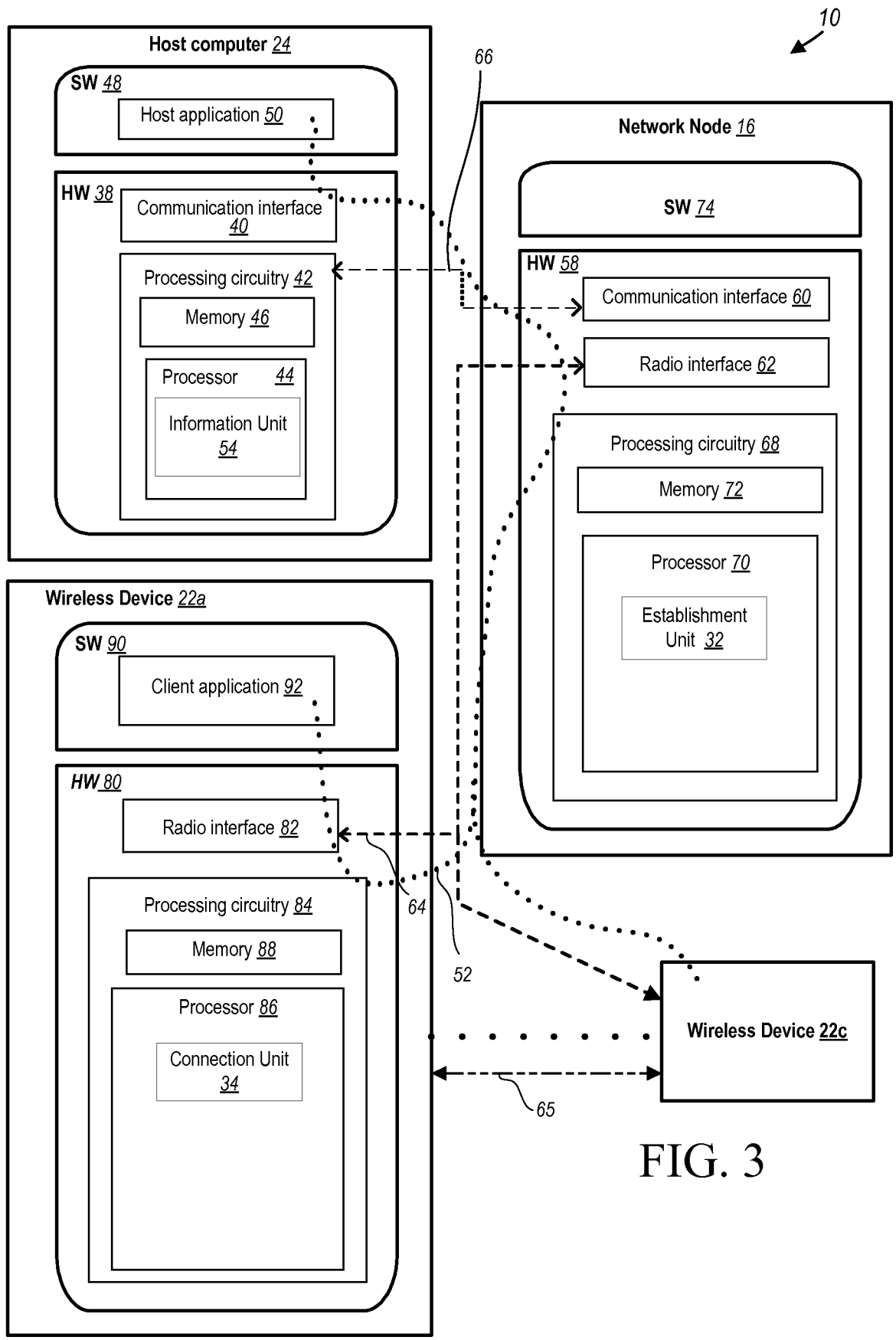
FIG. 3 is a block diagram of a host computer communicating via a network node with a wireless device over an at least partially wireless connection according to some embodiments of the present disclosure.

In some embodiments, the inner workings of the network node 16, wireless device 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the wireless device 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the wireless device 22 and the network node 16 is in accordance with the teachings of the embodiments described throughout this disclosure. One or more of the various embodiments improve the performance of OTT services provided to the wireless device 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve. There may further be an optional network functionality for reconfiguring the OTT connection 52 between the host computer 24 and wireless device 22, in response to variations in the measurement results. The measurement procedure and/or the network functionality for reconfiguring the OTT connection 52 may be implemented in the software 48 of the host computer 24 or in the software 90 of the wireless device 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device 22 signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the wireless device 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the wireless device 22, and/or preparing/terminating/maintaining/supporting/ending in receipt of a transmission from the wireless device 22.

In some embodiments, the host computer 24 includes processing circuitry 42 and a communication interface 40 that is configured to a communication interface 40 configured to receive user data originating from a transmission from a wireless device 22 to a network node 16. In some embodiments, the wireless device 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as establishment unit 32, and connection unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 4:
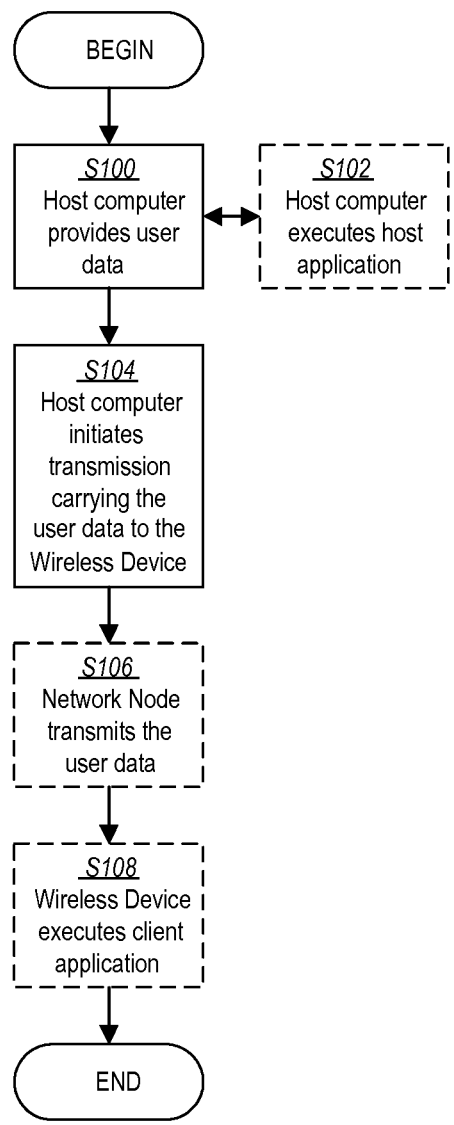
FIG. 4 is a flow chart illustrating exemplary methods implemented in a communication system including a host computer, a network node and a wireless device for executing a client application at a wireless device according to some embodiments of the present disclosure.

FIG. 4 is a flowchart illustrating an exemplary method implemented in a communication system, such as, for example, the communication system of FIGS. 2 and 3, in accordance with one embodiment. The communication system may include a host computer 24, a network node 16 and a wireless device 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the wireless device 22 (Block S104). In an optional third step, the network node 16 transmits to the wireless device 22 the user data which was carried in the transmission that the host computer 24 initiated, in accordance with the teachings of the embodiments described throughout this disclosure (Block S106). In an optional fourth step, the wireless device 22 executes a client application, such as, for example, the client application 92, associated with the host application 50 executed by the host computer 24 (Block S108).

Figure 5:
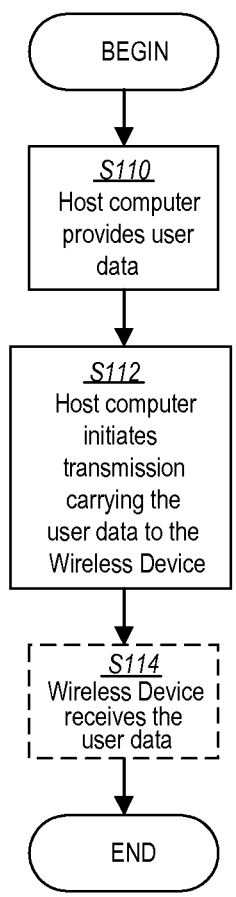
FIG. 5 is a flow chart illustrating exemplary methods implemented in a communication system including a host computer, a network node and a wireless device for receiving user data at a wireless device according to some embodiments of the present disclosure.

FIG. 5 is a flowchart illustrating an exemplary method implemented in a communication system, such as, for example, the communication system of FIG. 2, in accordance with one embodiment. The communication system may include a host computer 24, a network node 16 and a wireless device 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the wireless device 22 (Block S112). The transmission may pass via the network node 16, in accordance with the teachings of the embodiments described throughout this disclosure. In an optional third step, the wireless device 22 receives the user data carried in the transmission (Block S114).

FIG. 6 is a flowchart illustrating an exemplary method implemented in a communication system, such as, for example, the communication system of FIG. 2, in accordance with one embodiment. The communication system may include a host computer 24, a network node 16 and a wireless device 22, which may be those described with reference to FIGS. 2 and 3. In an optional first step of the method, the wireless device 22 receives input data provided by the host computer 24 (Block S116). In an optional substep of the first step, the wireless device 22 executes the client application 92, which provides the user data in reaction to the received input data provided by the host computer 24 (Block S118). Additionally or alternatively, in an optional second step, the wireless device 22 provides user data (Block S120). In an optional substep of the second step, the wireless device 22 provides the user data by executing a client application, such as, for example, client application 92 (Block S122). In providing the user data, the executed client application 92 may further consider user input received from the user. Regardless of the specific manner in which the user data was provided, the wireless device 22 may initiate, in an optional third substep, transmission of the user data to the host computer 24 (Block S124). In a fourth step of the method, the host computer 24 receives the user data transmitted from the wireless device 22, in accordance with the teachings of the embodiments described throughout this disclosure (Block S126).

FIG. 7 is a flowchart illustrating an exemplary method implemented in a communication system, such as, for example, the communication system of FIG. 2, in accordance with one embodiment. The communication system may include a host computer 24, a network node 16 and a wireless device 22, which may be those described with reference to FIGS. 2 and 3. In an optional first step of the method, in accordance with the teachings of the embodiments described throughout this disclosure, the network node 16 receives user data from the wireless device 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
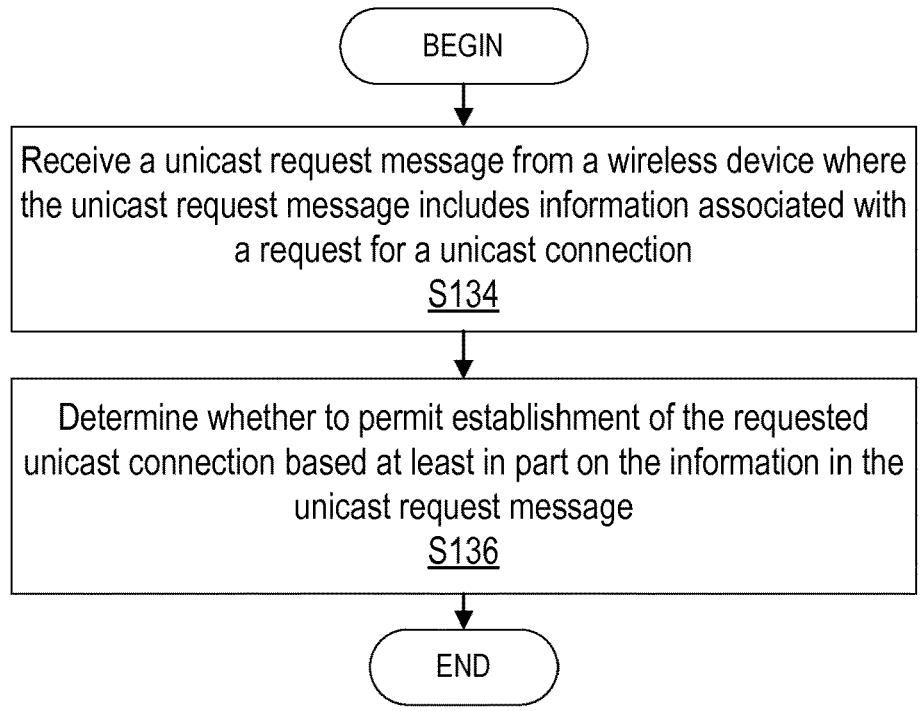
FIG. 8 is a flowchart of an example process in a network node for unicast connection related processes and/or functions according to some embodiments of the present disclosure.

FIG. 8 is a flowchart of an example process of establishment unit 32 in a network node 16 for performing unicast connection related functions and/or processes according to one or more embodiments of the present disclosure. One or more Blocks and/or functions performed by network node 16 may be performed by one or more elements of network node 16 such as by establishment unit 32 in processing circuitry 68, processor 70, radio interface 62, etc. In one or more embodiments, network node 16 such as via one or more of processing circuitry 68, processor 70, communication interface 60, establishment unit 32 and radio interface 62 is configured to receive (Block S134) a unicast request message from a wireless device 22 where the unicast request message includes information associated with a request for a unicast connection. In one or more embodiments, network node 16 such as via one or more of processing circuitry 68, processor 70, communication interface 60, establishment unit 32 and radio interface 62 is configured to determine (Block S136) whether to permit establishment of the requested unicast connection based at least in part on the information in the unicast request message.

According to one or more embodiments, status information is transmitted to the wireless device 22 where the status information indicates whether the requested unicast connection is permitted to be established, and the requested unicast connection is a sidelink (SL) unicast connection. According to one or more embodiments, the status information includes at least one of the following: a global unicast connection identifier, a local unicast connection identifier, a Physical Cell Identity (PCI) associated with the requested unicast connection, a Quality of Service (QoS) configuration for the requested unicast connection, an identifier corresponding to the wireless devices 22 involved in the requested unicast connection, at least one service type allowed over the requested unicast connection, and a transmitter parameter list for use when transmitting packets for the requested unicast connection.

Figure 9:
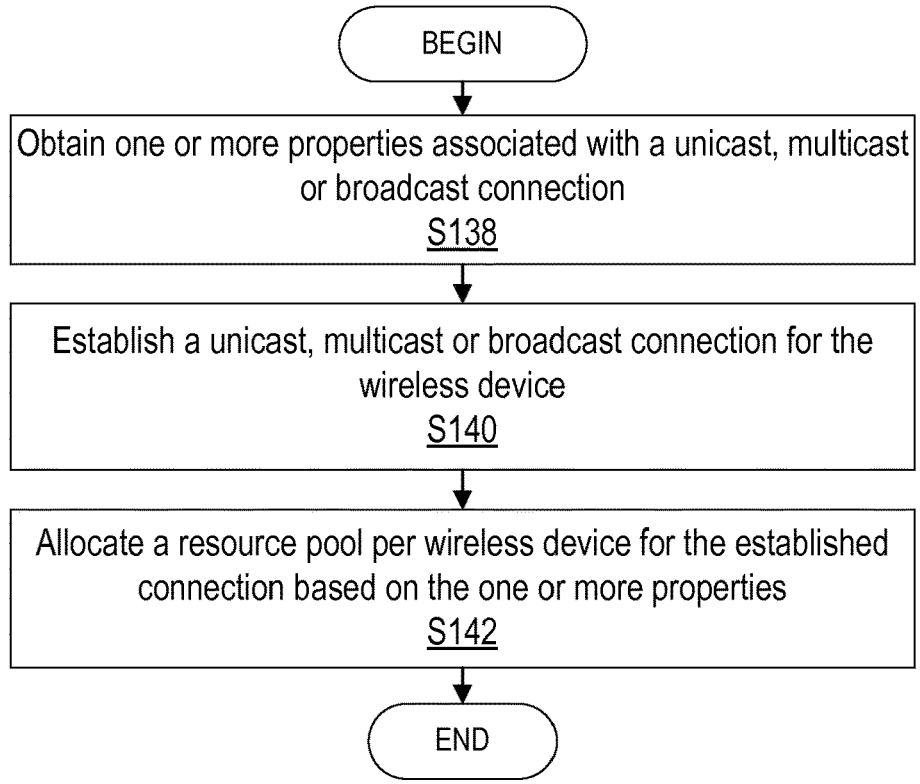
FIG. 9 is a flowchart of another example process in a network node according to some embodiments of the present disclosure.

FIG. 9 is a flowchart of another example process of network node 16 according to some embodiments of the present disclosure. One or more Blocks and/or functions performed by network node 16 may be performed by one or more elements of network node 16 such as by establishment unit 32 in processing circuitry 68, processor 70, radio interface 62, etc. In one or more embodiments, network node 16 such as via one or more of processing circuitry 68, processor 70, establishment unit 32, communication interface 60 and radio interface 62 is configured to obtain (Block S138) one or more properties associated with a unicast, multicast or broadcast connection, as described herein. In one or more embodiments, network node 16 such as via one or more of processing circuitry 68, processor 70, establishment unit 32, communication interface 60 and radio interface 62 is configured to establish (Block S140) a unicast, multicast or broadcast connection for the wireless device 22, as described herein. In one or more embodiments, network node 16 such as via one or more of processing circuitry 68, processor 70, establishment unit 32, communication interface 60 and radio interface 62 is configured to allocate (Block S142) a resource pool per wireless device 22 for the established connection based on the one or more properties, as described herein.

According to one or more embodiments, the one or more properties are one or more of: a wireless device location; a wireless device capability; a maximum power level for the unicast connection; a quality of service level; a global unicast connection identifier; and a physical cell identifier of a cell that is in communication with the wireless device. According to one or more embodiments, the resource pool corresponds to another resource pool allocated to another wireless device 22. According to one or more embodiments, the processing circuitry 68 is further configured to indicate the allocated resource pool to the wireless device 22 for one of autonomous resource allocation and network node 16 scheduled resource allocation. According to one or more embodiments, the obtained one or more properties are received from the wireless device 22 in a request for configuration of the unicast, multicast or broadcast connection.

According to one or more embodiments, the request message indicates a preferred casting type, and the allocated resource pool being for the preferred casting type. According to one or more embodiments, the request message indicates a plurality of casting types, each casting type having a respective priority where the allocated resource pool is for one of the plurality of casting types. According to one or more embodiments, the allocated resource pool is dedicated for use by the wireless device 22. According to one or more embodiments, the plurality of casting types includes at least two of unicast, multicast and broadcast. According to one or more embodiments, the resource pool corresponds to at least one of a set of spatial directions and a location area.

Figure 10:
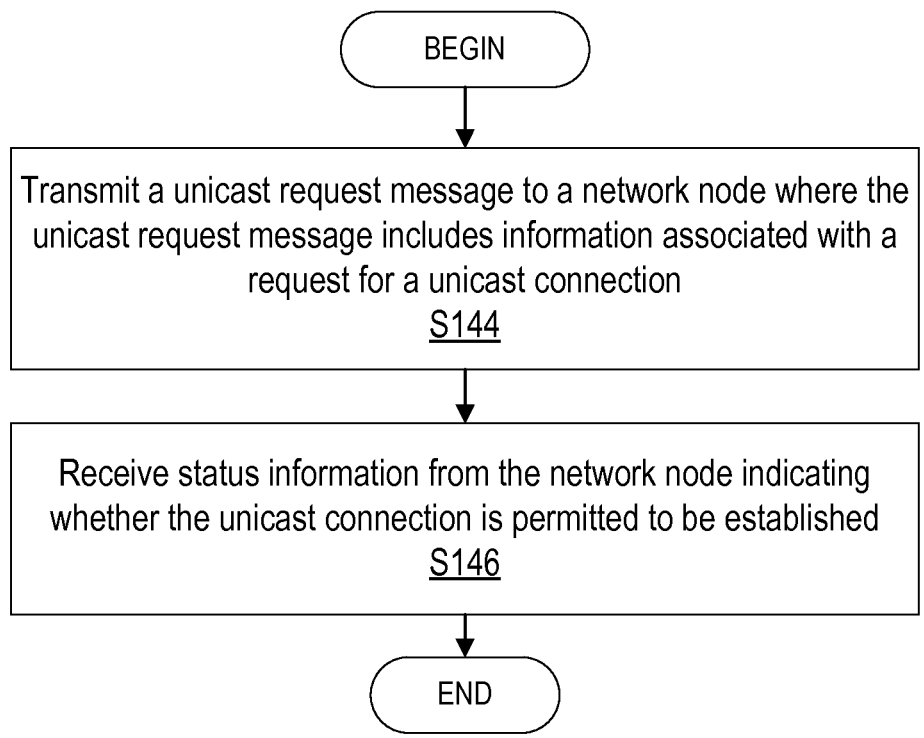
FIG. 10 is a flowchart of an example process in a wireless device for unicast connection related processes and/or functions according to some embodiments of the present disclosure.

FIG. 10 is a flowchart of an exemplary process of connection unit 34 in a wireless device 22 for performing unicast connection related functions and/or processes according to one or more embodiments of the present disclosure. One or more Blocks and/or functions performed by wireless device 22 may be performed by one or more elements of wireless device 22 such as by connection unit 34 in processing circuitry 84, processor 86, radio interface 82, etc. In one or more embodiments, wireless device 22 such as via one or more of processing circuitry 84, connection unit 34, processor 86 and radio interface 82 is configured to transmit a unicast request message to a network node 16 where the unicast request message includes information associated with a request for establishment of a unicast connection (Block S144). In one or more embodiments, wireless device 22 such as via one or more of processing circuitry 84, connection unit 34, processor 86 and radio interface 82 is configured to receive status information from the network node 16 indicating whether the unicast connection is permitted to be established (Block S146).

According to one or more embodiments, wherein the requested unicast connection is a sidelink (SL) unicast connection. According to one or more embodiments, the information in the unicast request message includes at least one of the following: a global unicast connection identifier, identities of the wireless devices 22 associated with the requested unicast connection, a Physical Cell Identifier (PCI) of a cell associated with the wireless device 22, a Quality of Service (QoS) level, a number of unicast connections to be established, a maximum power level the wireless device 22 is to use for unicast transmission, location information associated with the wireless device 22, and transmission capability of the wireless device 22.

According to one or more embodiments, the wireless device 22 is one of the following: the wireless device 22 that sent a request for unicast establishment over a PC5 interface, the wireless device 22 of a wireless device pair that is in radio resource control (RRC) connected mode while another wireless device 22 of the wireless device pair is in RRC idle mode, the wireless device 22 that is connected to a cell that supports sidelink communication, the wireless device 22 of a wireless device pair that is associated with a higher radio channel quality than another wireless device 22 of the wireless device pair, and the wireless device 22 of the wireless device pair that has a higher number of unicast connections than another wireless device 22 of the wireless device pair.

According to one or more embodiments, the requested unicast connection is associated with a set of transmitting parameters where the set of transmitting parameters configures the wireless device 22 to perform one of autonomous resource allocation and network scheduled resource allocation. According to one or more embodiments, autonomous resource allocation includes one of the following: the wireless device 22 of a wireless device pair autonomously selects resources from a resource pool that another wireless device 22 of the wireless device pair selects from, the wireless device 22 of a wireless device pair autonomously selects resources from a first resource pool that is different from a second resource pool that another wireless device 22 of the wireless device pair selects from, the wireless device 22 of a wireless device pair autonomously selects resources from a resource pool that is used for unicast and multicast connections associated with an information technology service, and the wireless device 22 of a wireless device pair autonomously selects resources from a resource pool that is used for unicast and multicast connections associated with the wireless device 22. According to one or more embodiments, the network scheduled resource allocation includes receiving a sidelink grant from the network node 16, the sidelink grant indicating resources to be used for the requested unicast connection.

Figure 11:
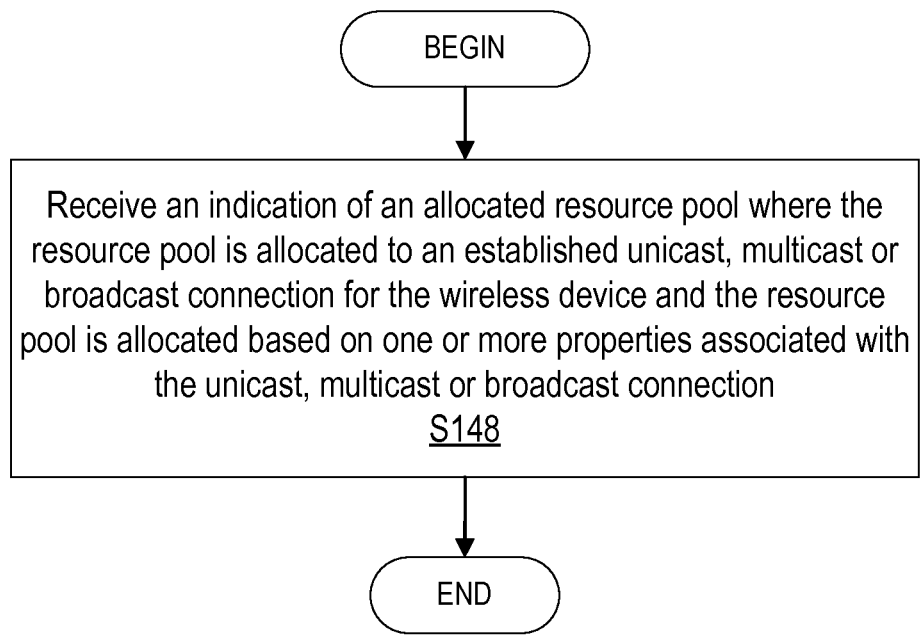
FIG. 11 is a flowchart of another example process in a wireless device according to some embodiments of the present disclosure.

FIG. 11 is a flowchart of another example process implemented by a wireless device 22 according to some embodiments of the present disclosure. One or more Blocks and/or functions performed by wireless device 22 may be performed by one or more elements of wireless device 22 such as by reporting unit 34 in processing circuitry 84, connection unit 34, processor 86, radio interface 82, etc. In one or more embodiments, wireless device 22 such as via one or more of processing circuitry 84, connection unit 34, processor 86 and radio interface 82 is configured to receive (Block S148) an indication of an allocated resource pool where the resource pool is allocated to an established unicast, multicast or broadcast connection for the wireless device 22 and the resource pool is allocated based on one or more properties associated with the unicast, multicast or broadcast connection. In one or more embodiments, the resource pool is one of a plurality of resource pools where each resource pool corresponds to time and frequency resources.

According to one or more embodiments, one or more properties are one or more of: a wireless device location, a wireless device capability, a maximum power level for the unicast connection, a quality of service level, a global unicast connection identifier, and a physical cell identifier of a cell that is in communication with the wireless device 22. According to one or more embodiments, the resource pool corresponds to another resource pool allocated to another wireless device 22. According to one or more embodiments, the indication of the allocated resource pool is for one of autonomous resource allocation and network node 16 scheduled resource allocation. According to one or more embodiments, the processing circuitry 84 is further configured to cause transmission of a request message that indicates the one or more properties for configuration of the unicast, multicast or broadcast connection.

According to one or more embodiments, the request message indicates a preferred casting type, and the allocated resource pool being for the preferred casting type. According to one or more embodiments, the request message indicates a plurality of casting types, each casting type having a respective priority, and the allocated resource pool being for one of the plurality of casting types. According to one or more embodiments, the allocated resource pool is dedicated for use by the wireless device 22. According to one or more embodiments, the plurality of casting types includes at least two of unicast, multicast and broadcast. According to one or more embodiments, the resource pool corresponds to at least one of a set of spatial directions and a location area.

Having generally described arrangements for unicast connection related processes and/or functions, details for these arrangements, functions and processes are provided as follows, and which may be implemented by the network node 16, wireless device 22 and/or host computer 24.

Some embodiments described herein target unicast connection use cases. However, the embodiments can be easily extended to multicast connections where a multicast connection is requested by a wireless device 22 in the network, and established/granted by the network or network node 16.

Methods for Unicast Connection Request—Wireless Device 22 Methods

In the following embodiment, it is considered that each unicast connection between a pair of two wireless devices 22 is identified by a unicast connection identifier. The global unicast connection identifier may be selected by higher layers, e.g., transport/network protocol, and may be represented in the form of destination identifier, or link layer address, geo-networking address and it may be unique in a certain area. Alternatively, the unicast connection identifier may be a pair ID assigned by the network node 16 and it may be unique within the cell.

Upon establishing a unicast connection, e.g., following a discovery procedure in which interested wireless devices 22 announce, e.g., with beacons, their characteristics such as service of interest, position, speed, etc., at least a wireless device 22 involved in such unicast connection, enters connected mode (if not yet in connected mode), and indicates to the network or network node 16 the intention to establish a unicast connection.

Such a unicast connection request message may be signaled by the wireless device 22 to the network node 16 via Radio Resource Control (RRC), see for example 3GPP TS 36.331 V14.2.2 or MAC see for example 3GPP TS 36.321 V14.2.1, and the unicast message connection request may contain a set of information related to the properties of such unicast connection. For example, the message may contain information related to one or more properties associated with the connection such as one or more of:

- The global unicast connection identifier, as provided by higher layers, i.e., higher Open Systems Interconnection (OSI) communication layers.
- The identities of the wireless devices 22 involved in the unicast connection, e.g., the Cell Radio Network Temporary Identifier (C-RNTI) if both wireless devices 22 that are in connected mode and have Uu connection towards the same cell.
- The Physical Cell Identifier (PCI) of the cell in which the two wireless devices 22 are camping on and/or connected to.
- The desired level of QoS. For example, during the unicast connection establishment procedure, the two wireless device 22 which would like to be involved in the same unicast connection, may select a certain level of QoS, depending on the quality of the channel that the wireless devices 22 are currently experiencing and the type of service the wireless devices 22 would like to exchange. Such QoS level may be represented by any QoS-related tag, such as QoS Class Identifier (QCI), or 5G QoS Indicator (5QI), or traffic priority requirements (PPPP), or reliability requirements (PPPR).
- The number of unicast connections the wireless device 22 would like to establish. For example, the wireless device 22 may not indicate the specific global unicast connection ID, rather only the number of different unicast connections needed or to be requested. In one or more embodiments, for each of such unicast connection desired, the wireless device 22 may indicate the desired level of QoS.
- The maximum power level that the wireless device 22 intends to use for transmission, if the unicast transmission is granted such as by network node 16. This information helps the network node 16 to evaluate whether the request can be granted without causing interference (i.e., interference above a threshold) to other ongoing connections.
- Location information in terms of, for example, Global Positioning System (GPS) coordinates. This information helps the network node 16 to determine whether the time/frequency resource(s) can be reused among already ongoing connections.
- The wireless device 22 capability such as multi-antenna etc. which can be used for transmissions.

At least a portion of the above set of information related to one or more properties associated with the connection is signaled in a unicast connection request message by at least a wireless device 22 (e.g., via, for example, one or more of radio interface 82, processing circuitry 84, connection unit 34, etc.) that is going to be involved in the unicast connection associated with the unicast connection request message. In particular, in order for a wireless device 22 to send such information to the network or network node 16, the wireless device 22 may fulfil one or several of the following criteria:

- It is the wireless device 22 that first sent or initiated such as via one or more of radio interface 82, processing circuitry 84, connection unit 34, etc. the request of unicast connection establishment over the PC5 interface. For example, it may be the wireless device 22 that first responds to a beacon message transmitted by a potential wireless device 22 peer in the surroundings.
- Assuming that one wireless device 22 of the potential sidelink pair is already in Uu RRC CONNECTED mode, and the other wireless device 22 is in IDLE mode, it is the wireless device 22 which is already in connected mode that may transmit such as via radio interface 82 the unicast connection request message. In another embodiment, if both wireless devices 22 are already in connected mode, i.e., RRC CONNECTED mode, both perform such action.
- If two wireless devices 22 are camping and/or are connected to different cells, it is the wireless device 22 which is camping and/or connected to a cell which is providing/supporting SL communications, e.g., a cell which is broadcasting a V2X-System Information Block (SIB) and/or the V2X-SIB is signaling the resources to communicate over PC5, that may transmit such as via radio interface 82 the unicast connection request message.
- It is the wireless device 22 which is experiencing better Uu radio channel quality, i.e., better Reference Signal Received Power (RSRP)/Reference Signal Received Quality (RSRQ), or the Uu RSRP/RSRQ is above a certain threshold provided by the network, may transmit such as via radio interface 82 the unicast connection request message.
- It is the wireless device 22 that has the highest number of unicast connections that may transmit such as via radio interface 82 the unicast connection request message.

In one or more embodiments, both wireless devices 22 involved in a unicast connection may enter connected mode (if not yet in connected mode) and perform the actions disclosed in one or more embodiments described herein such as via one or more of processing circuitry 84, connection unit 34, etc. In one or more embodiments, when transmitting the unicast connection request message to indicate the intention to establish one or more unicast connections, if the wireless device 22 transmitting the unicast connection request message is already involved in other sidelink unicast connections, the wireless device 22 may only transmit such as via radio interface 82 information related to the new unicast connection(s) that the wireless device 22 intends to establish, i.e., delta information. Alternatively, the unicast connection request message may include a list of all the unicast connections in which the wireless device 22 is currently involved.

When releasing one or more unicast connections, the wireless device 22 may send such a via radio interface 82 a unicast connection release message indicating the one or more unicast connections that are intended to be released. The releasing message may be triggered upon upper layer decision to tear down, i.e., release, a unicast/multicast connection (e.g., wireless device 22 is not interested or going to be using the same service, wireless device 22 is far apart, wireless device 22 is exiting emergency situations, etc.), or radio layers or access stratum or non-access stratum event (such as when leaving a certain cell at handover (HO), or leaving a certain geographical area).

In one alternative method, at least a portion of the above set of information are set in a unicast connection status message, which is sent whenever there is unicast connection that is intended to be established, or releases. The list of unicast connections transmitted in unicast connection status message may contain all the unicast connections that the wireless device 22 has currently established, and it would like to keep and/or the unicast connection that the wireless device 22 would like to establish (new information element in the "unicast connection status message" compared with last transmission of "unicast connection status message"). The unicast connections that are missing in "unicast connection status message" compared with the last transmission of "unicast connection status message" are intended to be released by the network or network node 16 such as via one or more of processing circuitry 68, establishment unit 32, etc.

While the details of how the wireless device 22 decides to establish a sidelink (SL) unicast connection and details of the procedure performed over the PC5 interface for determining the need for a unicast connection have not been described herein, these processes and/or procedures are beyond the scope of the disclosure and are assumed to have been performed.

Methods to Unicast Connection Establishment—Network Node 16 Methods

Upon reception via radio interface 62 of the information related to the unicast connections that the wireless device 22 would like to establish (as described in the previous section), the network node 16 such as via processing circuitry 68, establishment unit 32, etc. may perform a different set of actions depending on whether the network or network node 16 determines to configure wireless device-autonomous RA or network node scheduled RA. Details of resource pool configuration are provided below.

In one or more embodiments, irrespective of whether the network node 16 configures wireless device-autonomous RA or network node scheduled RA, the network or network node 16 such as via one or more of radio interface 62, processing circuitry 68, establishment unit 32, etc. replies to the unicast connection request/status message by indicating whether the connection can be established or not. The network or network node 16 may for example transmit such as via radio interface 62 an RRC message indicating the unicast connection that can be established. Such a unicast connection setup message may be part of the RRC connection reconfiguration message and it may be sent such as via radio interface 62 to either both wireless devices 22 that are going to be involved in the sidelink unicast connection, or only to the wireless device(s) 22 which transmitted the unicast connection request/status message following any of the methods disclosed in the previous embodiments. Such message may contain one or more of the following information:

The global unicast connection identifier as transmitted by, for example, radio interface 82 of the wireless device 22 in a unicast connection request/status message.

The local unicast connection identifier assigned by, for example, processing circuitry 68 of the network node 16. Such an identifier may be unique within the cell and it may be generated locally by, for example, processing circuitry 68 the network node 16 upon reception of the unicast connection request/status message. At reception of the local unicast connection identifier, the wireless device 22 associates the local unicast connection identifier given by the network or network node 16 to the global unicast connection identifier given previously by upper communication layers. In case the local unicast connection identifier is not signaled to the wireless device 22, it may be a wireless device 22 responsibility/implementation to associate the configuration to a unicast connection such as the most appropriate unicast connection.

For example, the network or network node 16 may only signal the QoS configuration/requirement (as described below) associated to the unicast connection, so that the wireless device 22 may associate such a unicast configuration to the traffic type which has similar QoS requirements. Similarly, the network or network node 16 may only signal such as via radio interface 62 the service types (as described below) to such unicast configuration, so that the wireless device 22 may apply the unicast configuration to transmit the traffic associated to the same service type.

The PCI in which the unicast connection can be kept.

The QoS configuration for such unicast connection. For example, the data radio bearers to be used for the packets transmitted over the associated unicast connection, the logical channels (LCIDs) to be reserved/used for such unicast communication, the associated priority, the bit rate for each logical channel that cannot be exceeded for transmissions of packets associated to such logical channels configured to be used for unicast communication.

An identifier (ID) which is specific of the wireless devices 22 involved in such unicast connection, e.g., the ID can be a C-RNTI but also a peer-specific ID with the following properties: The ID may be at least different for the two wireless device 22 involved in the same unicast connection, but wireless device 22 involved in different unicast connection may get the same ID. For example, in case of multicast connection, the network or network node 16 may assign such as via one or more of processing circuitry 68, radio interface 62, establishment unit 32, etc. a "local multicast connection identifier" and a wireless device ID to each wireless device 22 such that the ID is different for different wireless devices 22 involved in same multicast connection, but it can be the same for wireless devices 22 involved in different multicast connection.

The service types allowed over this unicast/multicast connection. To indicate the relevant service types, the network or network node 16 may use the ITS service IDs, or the global destination addresses associated to such service types.

Transmitting parameter list to be used when transmitting packets for such unicast connection: such list may contain, e.g., the resource pool configuration, maximum transmitting power, minimum/maximum Modulation Coding Scheme (MCS) that can be used, etc.

At reception of the unicast connection setup message, the wireless device 22 may indicate such as via one or more of radio interface 82, connection unit 34, etc., to higher layers (i.e., communication layers) the global unicast connection identifier associated to the unicast connection that the network or network node 16 has established. The wireless device 22 which receives such as via radio interface 82 the unicast connection setup message may indicate over SL to the peer wireless device 22 involved in the same unicast connection that the local unicast connection identifier has been given by the network or network node 16, as well as other information contained in unicast connection setup message, such as the transmitting parameters to be used for such unicast transmission. This may happen for example if only one wireless device 22 is in Uu connected mode and the other wireless device 22 remained in RRC IDLE mode, so that the network or network node 16 may not send the unicast connection setup message to the IDLE mode wireless device 22.

When transmitting the unicast connection setup message such as via one or more of radio interface 62, communication interface 60, etc., the network node 16 may indicate to other node(s) in the network that the wireless devices 22 are going to be involved in the unicast connection.

To release any of the unicast connection previously established in unicast connection setup message, the network node 16 may transmit such as via one or more of communication interface 60, radio interface 62, etc., at least a portion of the information or content described above except the transmitting parameters, so that the wireless device 22 may release the associated sidelink unicast connection, if the information element (IE) containing the unicast connection identifier does not contain the transmitting parameter list. In one or more embodiments, a separate message, e.g., unicast connection release message", is used/transmitted such as via one or more of radio interface 62, communication interface 60, establishment unit 32, etc., of the network node 16 to indicate the identity of the unicast connection to be released. When releasing a certain sidelink unicast connection, the wireless device 22 may indicate such as via one or more of radio interface 82, connection unit 34, processing circuitry 84, etc., to higher layers, such as application layer, the global unicast connection identifier associated to the unicast connection to be released. Higher layers may trigger procedures between peer wireless devices 22 associated to the same unicast connection to release it. Also, in this case, the release of the unicast configuration can be signaled over PC5 by the peer wireless device(s) 22 such as via radio interface 82 for the concerned unicast connections affecting such peers that are going to be released, e.g. the peer wireless device(s) 22 may signal the concerned local unicast connection identifier of the unicast connections to be released.

Resource Pool Configuration Embodiments

In one or more of the embodiments described above, methods for configuring unicast connections are disclosed. The configuration may contain a set transmitting parameters including the set of resources to be used for sidelink unicast communication as described in above embodiments. The set of resources may be organized into resource pools or bandwidth parts (BWP).

The resource pools may be configured differently by the network node 16 such a via one or more of processing circuitry 68, radio interface 62, communication interface 60, establishment unit 32, etc., (either via RRC or Layer 1 (L1)/Layer 2 (L2) signalling), e.g.:

The network node 16 configures such as via one or more of processing circuitry 68, establishment unit 32, radio interface 62, etc., the wireless device(s) 22 to perform autonomous RA (e.g. mode-4 i.e. transmission parameters are selected autonomously by the wireless device 22) for the concerned unicast connection, for example:

The same resource pool is used by wireless devices 22 involved in the same unicast connection. The two wireless devices 22 autonomously select such as via one or more of processing circuitry 84, connection unit 34, etc., resources signaled in such pool upon performing sensing over such pool such as via radio interface 82 and determining the amount of resources needed for the concerned type of traffic/QoS configuration signaled in unicast connection setup message. The network node 16 may assign such as via one or more of processing circuitry 68, radio interface 62, establishment unit 32, etc., the same resource pool for different unicast connections in case wireless devices 22 involved in such unicast connection are sufficiently far apart, e.g., the network or network node 16 may rely on wireless device 22 positioning signaling to determine such as via one or more of processing circuitry 68, establishment unit 32, etc., whether the same pool can be assigned to different unicast connections. The network or network node 16 may also assign such as via one or more of radio interface 62, processing circuitry 68, establishment unit 32, etc., the same pool to broadcast/multicast connection.

Two different pools are assigned to wireless devices 22 involved in the same unicast connection. This may be signaled such as via radio interface 62 of network node 16 by indicating two separate pools to wireless device 22a and wireless device 22b. For example, the network or network node 16 may indicate such as via radio interface 62 to wireless device 22a to use as TX pool the pool A, while the pool A is indicated as receiving pool to wireless device 22b. Similarly, the network or network node 16 indicates such as via radio interface 62 to wireless device 22b to use pool B as transmitter/transmitting TX pool, while pool B is indicated as receiver/receiving (RX) pool to wireless device 22a. In an alternative signaling, the network or network node 16 uses the wireless device ID indicated in unicast connection setup message to address the pool, e.g., the network or network node 16 may signal such as via radio interface 62 a single pool indicating the portions of the pool to be used for transmission by wireless device 22a and wireless device 22b. Wireless device 22a and wireless device 22b may then determine such as via respective processing circuitry 84 the portion of the pool in which to perform SL reception.

Within the transmitting pool/portion of pool, the wireless device 22 may then perform sensing such as via one or more of radio interface 82, processing circuitry 84, connection unit 34, etc., and autonomously select resources on the basis of the traffic type and sensing results, as well as by taking into account the QoS requirements and configuration indicated in unicast connection setup message. As for the case above, such pool may be reused for other unicast/multicast/broadcast connections.

The same resource pool is used for all those unicast/multicast connections associated to the same ITS service, e.g., the network or network node 16 may configure such as via one or more of processing circuitry 68, establishment unit 32, etc., a larger set of resources for those services demanding higher QoS requirements.

The same resource pool is used for all the unicast/multicast connections associated with the same wireless device 22, e.g., a network or network node 16 may configure a resource pool per wireless device 22 which is involved in multiple unicast sessions. In one or more embodiments, the resource pool allocated for the wireless device 22 for one or more connections associated with the wireless device 22 may be dedicated for use by the wireless device 22 such that the resource pool is allocated per wireless device 22.

The network node 16 configures such as via one or more of processing circuitry 68, radio interface 62, establishment unit 32, etc., the wireless device(s) 22 to perform network-scheduled RA (e.g., mode-3) for the concerned unicast connection.

The network or network node 16 may configure such as via one or more of processing circuitry 68, radio interface 62, establishment unit 32, etc., one or more network-scheduled pool (either via RRC or L1/L2 signalling), following any of the options disclosed above for autonomous RA.

The network or network node 16 indicates such as using radio interface 62 via PDCCH the SL grant containing the transmitting resources to be used for the concerned unicast connection. The Downlink Control Information (DCI) used to transmit the SL grant may contain one or more different fields such as the local unicast connection identifier, the wireless device ID of the wireless device 22, e.g., wireless device 22a which is scheduled for transmissions. By decoding the DCI, the wireless device 22b which is not scheduled for transmission determines that the network or network node 16 has scheduled transmission for a unicast connection of interest to the peer wireless device 22, and it uses the grant to determine in which resource to perform reception. In one or more embodiments, the DCI is scrambled with the local unicast connection identifier so that only the wireless device 22 interested in such unicast connection may decode the scrambled DCI.

As described in the methods to unicast connection establishment—network node 16 methods section, the above signaling (e.g., RRC, PDCCH) containing resource pool configuration or SL grant assignments may be also transmitted over the SL, e.g., in case only one of the wireless devices 22 involved in the unicast connection is receiving the above resource pool/SL grant info.

SOME EXAMPLES

Example A1. A network node 16 configured to communicate with a wireless device 22, the network node 16 configured to, and/or comprising a radio interface 62 and/or comprising processing circuitry 68 configured to:
receive a unicast request message from a wireless device 22, the unicast request message including information associated with a request for a unicast connection; and
determine whether to permit establishment of the requested unicast connection based at least in part on the information in the unicast request message.

Example A2. The network node 16 of Example A1, the network node 16 being further configured to, and/or the radio interface 62 and/or the processing circuitry 68 being further configured to transmit status information to the wireless device 22 indicating whether the requested unicast connection is permitted to be established; and the requested unicast connection being a sidelink (SL) unicast connection.

Example A3. The network node 16 of Example A2, wherein the status information includes at least one of the following:
a global unicast connection identifier;
a local unicast connection identifier;
a Physical Cell Identity (PCI) associated with the requested unicast connection;
a Quality of Service (QoS) configuration for the requested unicast connection;
an identifier corresponding to the wireless devices 22 involved in the requested unicast connection;
at least one service type allowed over the requested unicast connection; and
a transmitter parameter list for use when transmitting packets for the requested unicast connection.

Example B1. A method implemented in a network node 16, the method comprising:
receiving a unicast request message from a wireless device 22, the unicast request message including information associated with a request for a unicast connection; and
determining whether to permit establishment of the requested unicast connection based at least in part on the information in the unicast request message.

Example B2. The method of Example B1, further comprising transmitting status information to the wireless device 22 indicating whether the requested unicast connection is permitted to be established; and
the requested unicast connection being a sidelink (SL) unicast connection Example B3. The method of Example B2, wherein the status information includes at least one of the following:
a global unicast connection identifier;
a local unicast connection identifier;
a Physical Cell Identity (PCI) associated with the requested unicast connection;
a Quality of Service (QoS) configuration for the requested unicast connection;
an identifier corresponding to the wireless devices 22 involved in the requested unicast connection;
at least one service type allowed over the requested unicast connection; and
a transmitter parameter list for use when transmitting packets for the requested unicast connection.

Example C1. A wireless device 22 configured to communicate with a network node 16, the wireless device 22 configured to, and/or comprising a radio interface 82 and/or processing circuitry 84 configured to:
transmit a unicast request message to a network node 16, the unicast request message including information associated with a request for a unicast connection; and
receive status information from the network node 16 indicating whether the requested unicast connection is permitted to be established.

Example C2. The wireless device 22 of Example C1, wherein the requested unicast connection is a sidelink (SL) unicast connection.

Example C3. The wireless device 22 of Example C1, wherein the information in the unicast request message includes at least one of the following:
a global unicast connection identifier;

identities of the wireless devices 22 associated with the requested unicast connection;
a Physical Cell Identifier (PCI) of a cell associated with the wireless device 22;
a Quality of Service (QoS) level;
a number of unicast connections to be established;
a maximum power level the wireless device 22 is to use for unicast transmission;
location information associated with the wireless device 22; and
transmission capability of the wireless device 22.

Example C4. The wireless device 22 of Example C1, wherein the wireless device 22 is one of the following:
the wireless device 22 that sent a request for unicast establishment over a PC5 interface;
the wireless device 22 of a wireless device pair that is in radio resource control (RRC) connected mode while another wireless device 22 of the wireless device pair is in RRC idle mode;
the wireless device 22 that is connected to a cell that supports sidelink communication;
the wireless device 22 of a wireless device pair that is associated with a higher radio channel quality than another wireless device 22 of the wireless device pair; and
the wireless device 22 of the wireless device pair that has a higher number of unicast connections than another wireless device 22 of the wireless device pair.

Example C5. The wireless device 22 of Example C1, wherein the requested unicast connection is associated with a set of transmitting parameters, the set of transmitting parameters configuring the wireless device 22 to perform one of autonomous resource allocation and network scheduled resource allocation.

Example C6. The wireless device 22 of Example C5, wherein autonomous resource allocation includes one of the following:
the wireless device 22 of a wireless device pair autonomously selects resources from a resource pool that another wireless device 22 of the wireless device pair selects from;
the wireless device 22 of a wireless device pair autonomously selects resources from a first resource pool that is different from a second resource pool that another wireless device 22 of the wireless device pair selects from;
the wireless device 22 of a wireless device pair autonomously selects resources from a resource pool that is used for unicast and multicast connections associated with an information technology service; and
the wireless device 22 of a wireless device pair autonomously selects resources from a resource pool that is used for unicast and multicast connections associated with the wireless device 22.

Example C7. The wireless device 22 of Example C5, wherein the network scheduled resource allocation includes receiving a sidelink grant from the network node 16, the sidelink grant indicating resources to be used for the requested unicast connection.

Example D1. A method implemented in a wireless device 22, the method comprising:
transmitting a unicast request message to a network node 16, the unicast request message including information associated with a request for a unicast connection; and
receiving status information from the network node 16 indicating whether the requested unicast connection is permitted to be established.

Example D2. The method of Example D1, wherein the requested unicast connection is a sidelink (SL) unicast connection.

Example D3. The method of Example D1, wherein the information in the unicast request message includes at least one of the following:
a global unicast connection identifier;
identities of the wireless devices 22 associated with the requested unicast connection;
a Physical Cell Identifier (PCI) of a cell associated with the wireless device 22;
a Quality of Service (QoS) level;
a number of unicast connections to be established;
a maximum power level the wireless device 22 is to use for unicast transmission;
location information associated with the wireless device 22; and
transmission capability of the wireless device 22.

Example D4. The method of Example D1, wherein the wireless device 22 is one of the following:
the wireless device 22 that sent a request for unicast establishment over a PC5 interface;
the wireless device 22 of a wireless device pair that is in radio resource control (RRC) connected mode while another wireless device 22 of the wireless device pair is in RRC idle mode;
the wireless device 22 that is connected to a cell that supports sidelink communication;
the wireless device 22 of a wireless device pair that is associated with a higher radio channel quality than another wireless device 22 of the wireless device pair; and
the wireless device 22 of the wireless device pair that has a higher number of unicast connections than another wireless device 22 of the wireless device pair.

Example D5. The method of Example D1, wherein the requested unicast connection is associated with a set of transmitting parameters, the set of transmitting parameters configuring the wireless device 22 to perform one of autonomous resource allocation and network scheduled resource allocation.

Example D6. The method of Example D5, wherein autonomous resource allocation includes one of the following:
the wireless device 22 of a wireless device pair autonomously selects resources from a resource pool that another wireless device 22 of the wireless device pair selects from;
the wireless device 22 of a wireless device pair autonomously selects resources from a first resource pool that is different from a second resource pool that another wireless device 22 of the wireless device pair selects from;
the wireless device 22 of a wireless device pair autonomously selects resources from a resource pool that is used for unicast and multicast connections associated with an information technology service; and
the wireless device 22 of a wireless device pair autonomously selects resources from a resource pool that is used for unicast and multicast connections associated with the wireless device 22.

Example D7. The method of Example D5, wherein the network scheduled resource allocation includes receiving a sidelink grant from the network node 16, the sidelink grant indicating resources to be used for the requested unicast connection.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| 3G | Third Generation of Mobile Telecommunications Technology |
| 3GPP | Third Generation Partnership Project |
| BSM | Basic Safety Message |
| BW | Bandwidth |
| BWP | Bandwidth Part |
| BSR | Buffer Status Report |
| CAM | Cooperative Awareness Message |
| CBR | Channel Busy Ratio |
| CSI | Channel State Information |
| D2D | Device-to-Device Communication |
| DBS | Delay-Based Scheduler |
| DENM | Decentralized Environmental Notification Message |
| DL | Downlink |
| DMRS | Demodulation reference signals |
| DPTF | Data Packet Transmission Format |
| DSRC | Dedicated Short-Range Communications |
| eNB | eNodeB |
| ETSI | European Telecommunications Standards Institute |
| GNSS | Global Navigation Satellite System |
| IP | Internet Protocol |
| LCID | Logical Channel Identity |
| LCG | Logical Channel Group |
| LTE | Long-Term Evolution |
| MAC | Medium Access Control |
| MAC CE | MAC Control Element |
| NW | Network |
| OCC | Orthogonal cover code |
| PCI | Physical Cell Identity |
| PDCCH | Physical Downlink Control Channel |
| PDU | Packet Data Unit |
| PPPP | ProSe Per Packet Priority |
| ProSe | Proximity Services |
| PRB | Physical Resource Block |
| PSBCH | Physical Sidelink Broadcast Channel |
| PUSCH | Physical Uplink Shared Channel |
| PUCCH | Physical Uplink Control Channel |
| RA | Resource Allocation |
| RRC | Radio Resource Control |
| RS | Reference Signals |
| RSRP | (Reference Signal Received Power) |
| SA | Scheduling Assignment |
| SAE | Society of the Automotive Engineers |
| SCI | Sidelink Control Information |
| SFN | System Frame Number |
| SL | Sidelink |
| SPS | Semi-Persistent Scheduling |
| SPS | Semi Persistent Scheduling |
| TF | Transport Format |

-continued

| Abbreviation | Explanation |
|---|---|
| TTI | Transmission Time Interval |
| UE | User Equipment |
| UL | Uplink |
| V2I | Vehicle-to-Infrastructure |
| V2P | Vehicle-to-Pedestrian |
| V2V | Vehicle-to-(vehicle) communication |
| V2x | Vehicle-to-anything-you-can-imagine |
| wrt | with respect to |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node for allocating a resource pool for use by a wireless device in device to device communications, the resource pool being one of a plurality of resource pools, each resource pool comprising one or more time and frequency resource, the network node comprising processing circuitry configured to:
    obtain one or more properties associated with one of a unicast, multicast and broadcast connection, the obtained one or more properties being received from the wireless device in a request for configuration of the one of the unicast, multicast and broadcast connection, the request message indicating a preferred casting type, a casting type being one of unicast, multicast and broadcast;
    determine whether the requested configuration can be established; and
    allocate a resource pool per wireless device for the requested configuration based on the one or more properties and for the preferred casting type.

2. The network node of claim 1, wherein the one or more properties are one or more of:
    a wireless device location;
    a wireless device capability;
    a maximum power level for the unicast connection;
    a quality of service level;
    a global unicast connection identifier; and
    a physical cell identifier of a cell that is in communication with the wireless device.

3. The network node of claim 1, wherein the processing circuitry is further configured to indicate the allocated resource pool to the wireless device for one of autonomous resource allocation and network node scheduled resource allocation.

4. The network node of claim 1, wherein the request message indicates a plurality of casting types, each casting type having a respective priority; and
    the allocated resource pool being for one of the plurality of casting types.

5. The network node of claim 4, wherein the plurality of casting types includes at least two of unicast, multicast and broadcast.

6. A wireless device for using a resource pool for device to device communication, the resource pool being one of a plurality of resource pools, each resource pool corresponding to time and frequency resources, the wireless device comprising processing circuitry configured to:
    cause transmission of a request message that indicates one or more properties for configuration of one of a unicast, multicast and broadcast connection and indicates a preferred casting type, a casting type is one of unicast, multicast and broadcast; and
    receive an indication of an allocated resource pool, the resource pool being allocated to establish a unicast, multicast or broadcast connection for the wireless device and the resource pool being allocated based on one or more properties associated with the one of the unicast, multicast and broadcast connection, and the allocated resource pool being for the preferred casting type.

7. The wireless device of claim 6, wherein the request message indicates a plurality of casting types, each casting type having a respective priority; and
    the allocated resource pool being for one of the plurality of casting types.

8. The wireless device of claim 7, wherein the plurality of casting types includes at least two of unicast, multicast and broadcast.

9. A method implemented by a network node for allocating a resource pool for use by a wireless device in device to device communications, the resource pool being one of a plurality of resource pools, each resource pool comprising one or more time and frequency resource, the method comprising:
    obtaining one or more properties associated with one of a unicast, multicast and broadcast connection, the obtained one or more properties being received from the wireless device in a request for configuration of the one of the unicast, multicast and broadcast connection, the request message indicating a preferred casting type, a casting type being one of unicast, multicast and broadcast;
    determining whether the requested configuration can be established; and
    allocating a resource pool per wireless device for the requested configuration based on the one or more properties and for the preferred casting type.

10. The method of claim 9, wherein the one or more properties are one or more of:
    a wireless device location;
    a wireless device capability;
    a maximum power level for the unicast connection;
    a quality of service level;
    a global unicast connection identifier; and
    a physical cell identifier of a cell that is in communication with the wireless device.

11. The method of claim 9, wherein the resource pool corresponds to another resource pool allocated to another wireless device.

12. The method of claim 9, further comprising indicating the allocated resource pool to the wireless device for one of autonomous resource allocation and network node scheduled resource allocation.

13. The method of claim 9, wherein the request message indicates a plurality of casting types, each casting type having a respective priority; and
    the allocated resource pool being for one of the plurality of casting types.

14. The method of claim 9, wherein the plurality of casting types includes at least two of unicast, multicast and broadcast.

15. The method of claim 9, wherein the allocated resource pool is dedicated for use by the wireless device.

16. A method implemented by a wireless device for using a resource pool for device to device communication, the resource pool being one of a plurality of resource pools, each resource pool corresponding to time and frequency resources, the method comprising:
- transmitting a request message that indicates one or more properties for configuration of one of a unicast, multicast and broadcast connection and indicates a preferred casting type, a casting type being one of unicast, multicast and broadcast; and
- receiving an indication of an allocated resource pool, the resource pool being allocated to establish a unicast, multicast or broadcast connection for the wireless device and the resource pool being allocated based on one or more properties associated with the one of the unicast, multicast and broadcast connection, and the allocated resource pool being for the preferred casting type.

17. The method of claim 16, wherein one or more properties are one or more of:
- a wireless device location;
- a wireless device capability;
- a maximum power level for the unicast connection;
- a quality of service level;
- a global unicast connection identifier; and
- a physical cell identifier of a cell that is in communication with the wireless device.

18. The method of claim 16, wherein the indication of the allocated resource pool is for one of autonomous resource allocation and network node scheduled resource allocation.

19. The method of claim 16, wherein the request message indicates a plurality of casting types, each casting type having a respective priority; and
- the allocated resource pool being for one of the plurality of casting types.

20. The method of claim 19, wherein the plurality of casting types includes at least two of unicast, multicast and broadcast.

21. The method of claim 16, wherein the allocated resource pool is dedicated for use by the wireless device.

* * * * *